United States Patent [19]
Herrington et al.

[11] Patent Number: 4,654,648
[45] Date of Patent: Mar. 31, 1987

[54] WIRELESS CURSOR CONTROL SYSTEM

[76] Inventors: Richard A. Herrington, 2531 Wapiti Rd.; Ken L. Burgess, 2430 Kodiak Rd., both of Fort Collins, Colo. 80525

[21] Appl. No.: 682,615

[22] Filed: Dec. 17, 1984

[51] Int. Cl.⁴ .............................................. G09G 1/00
[52] U.S. Cl. .................................. 340/710; 340/706; 340/709; 178/18
[58] Field of Search ....................... 340/706, 709, 710; 178/18-20; 340/723

[56] References Cited
U.S. PATENT DOCUMENTS

| | | | |
|---|---|---|---|
| 4,246,439 | 1/1981 | Romain | 178/18 |
| 4,550,250 | 10/1985 | Mueller et al. | 340/710 |
| 4,559,642 | 12/1985 | Miyaji et al. | 340/709 |
| 4,565,999 | 1/1986 | King et al. | 340/709 |
| 4,578,674 | 3/1986 | Baker et al. | 178/18 |

OTHER PUBLICATIONS

"Cableless System Mouse" *IBM Technical Disc. Bul.*, vol. 28, No. 2, Jul. 1985, pp. 550-553.
"Ultrasonic Cursor Position Detection" *IBM Tech. Disc. Bul.*, vol. 27, No. 11, Apr. 1985, pp. 6712-6714.

*Primary Examiner*—Gerald L. Brigance
*Attorney, Agent, or Firm*—Dean P. Edmundson

[57] ABSTRACT

A position control system is described for the control of cursor movement on a video display terminal or the like. The control system includes a wireless movable steering means which emits acoustic signals, tracking means adapted to receive the acoustic signals and determine the position of the steering means by hyperbolic triangulation, and communication means for communicating the position (either absolute position or relative movement) of the steering means to the video display terminal.

14 Claims, 10 Drawing Figures

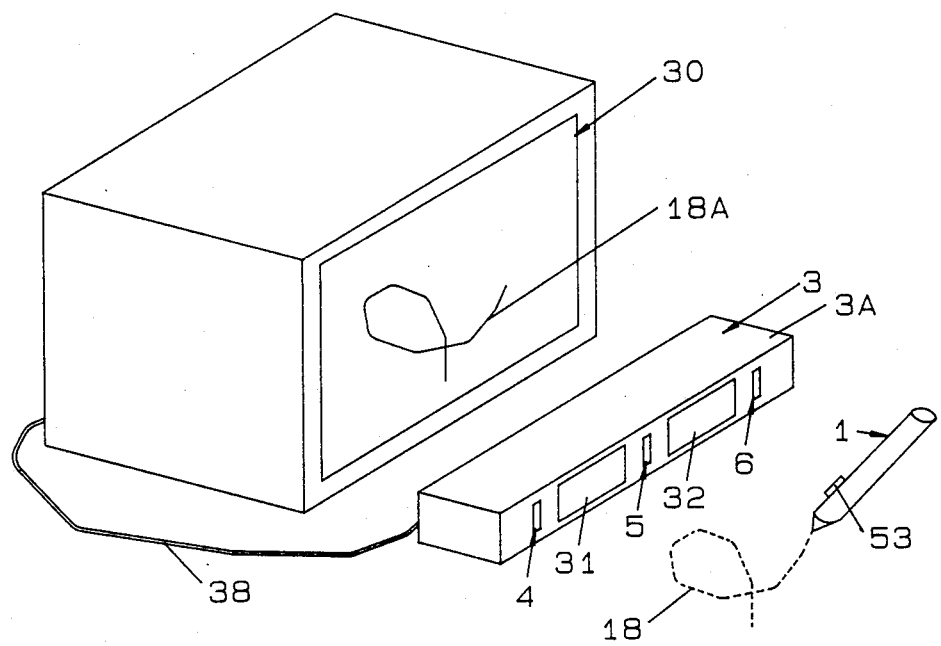
FIGURE #1

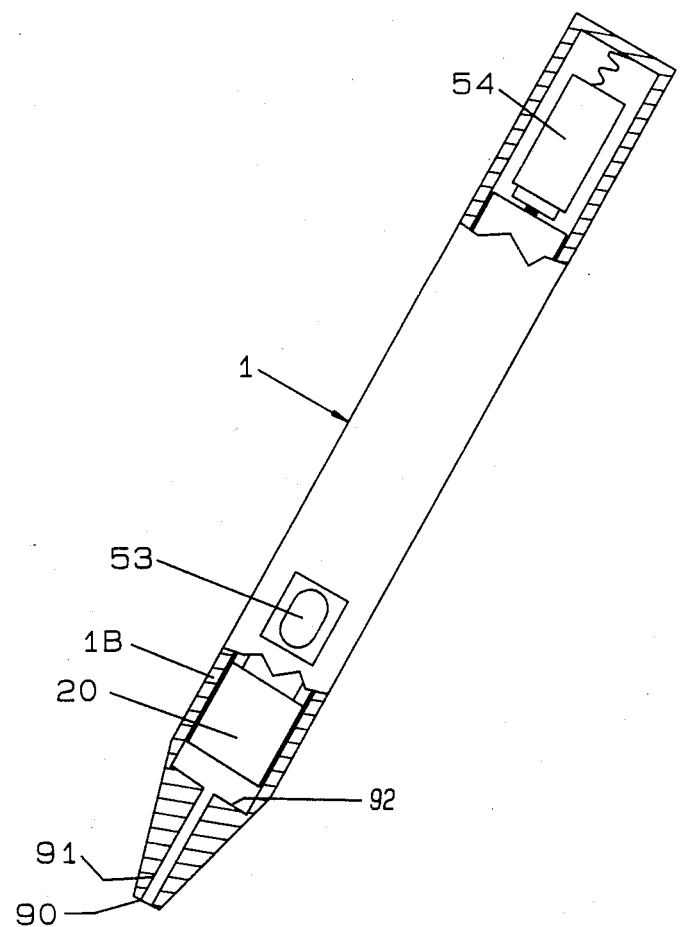
FIGURE #2

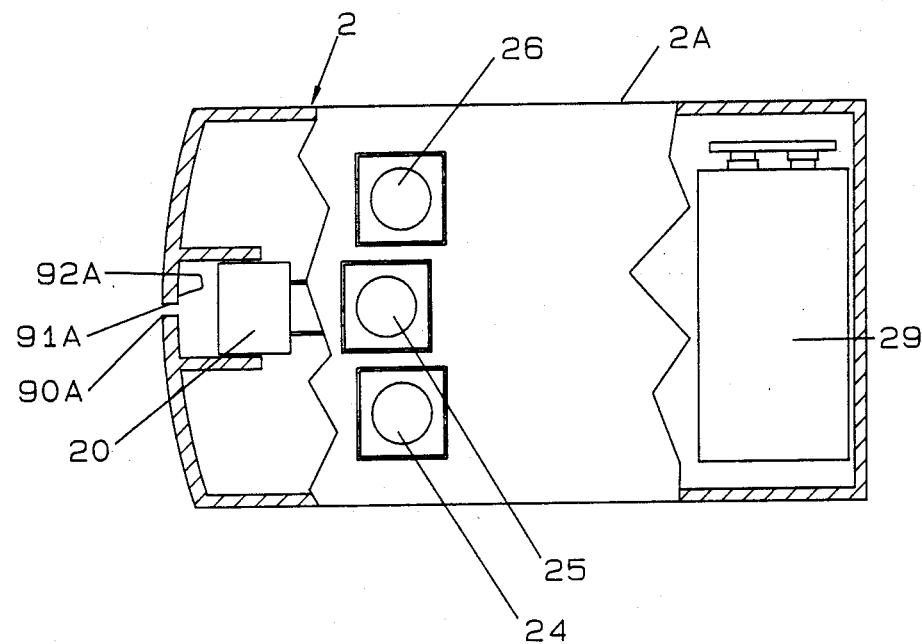
FIGURE #3

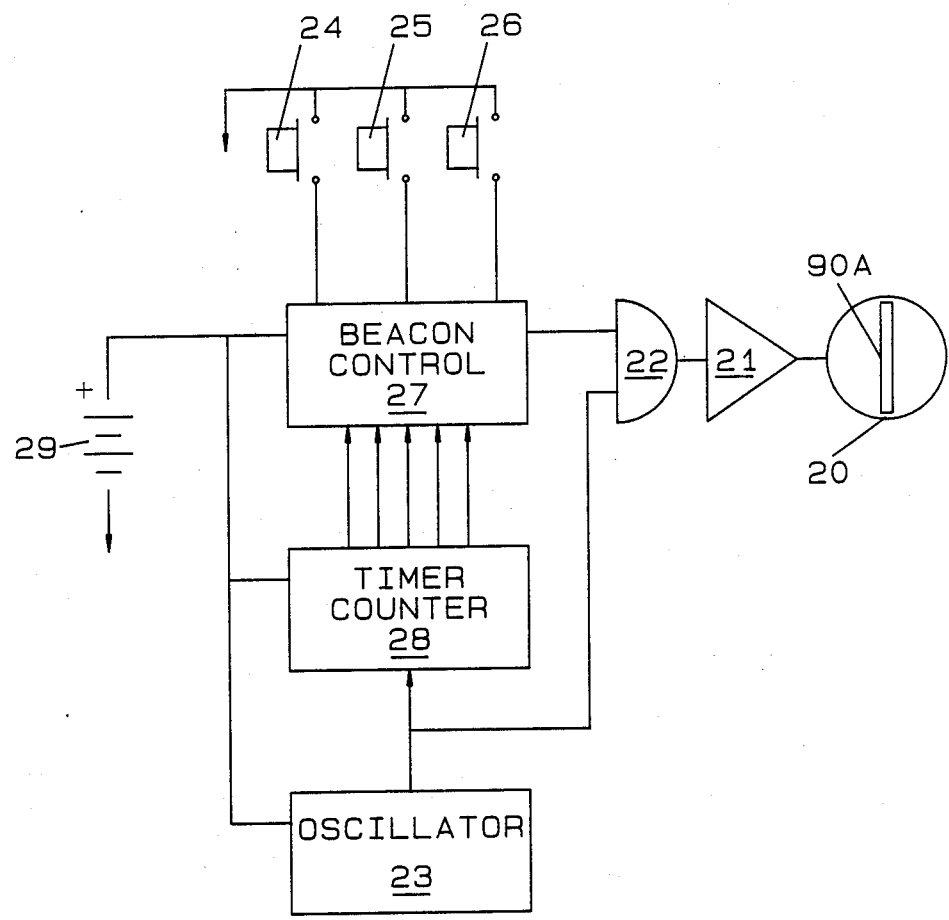
FIGURE #4

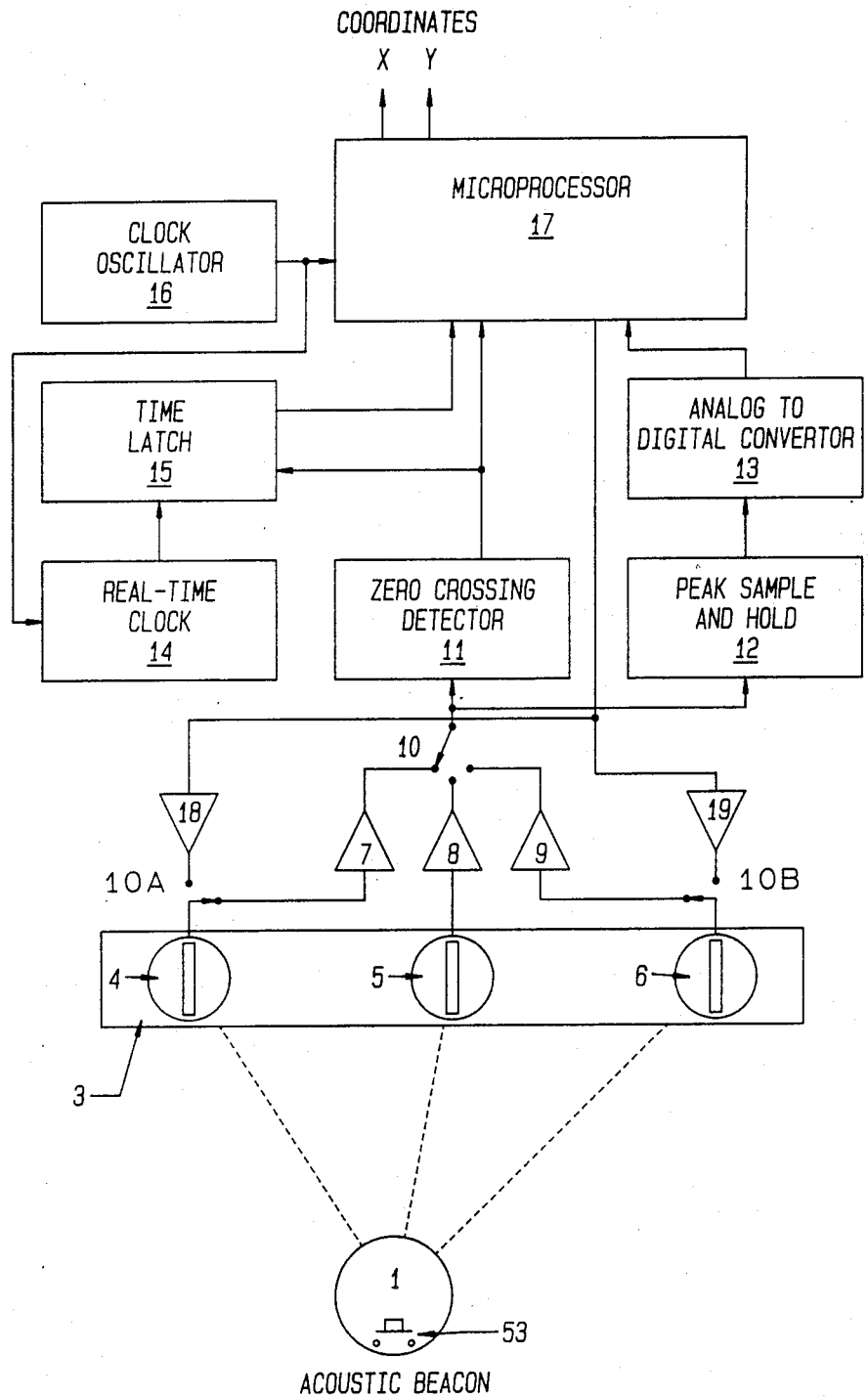
FIGURE #5

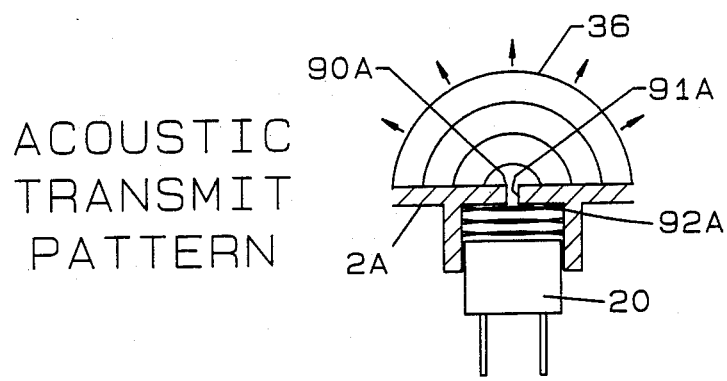
FIGURE #6
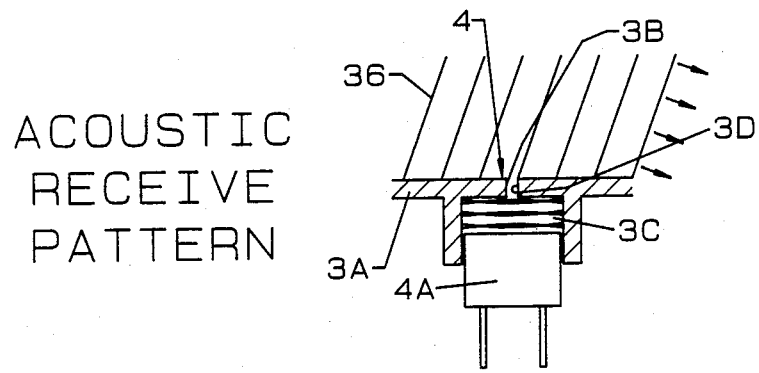
FIGURE #7

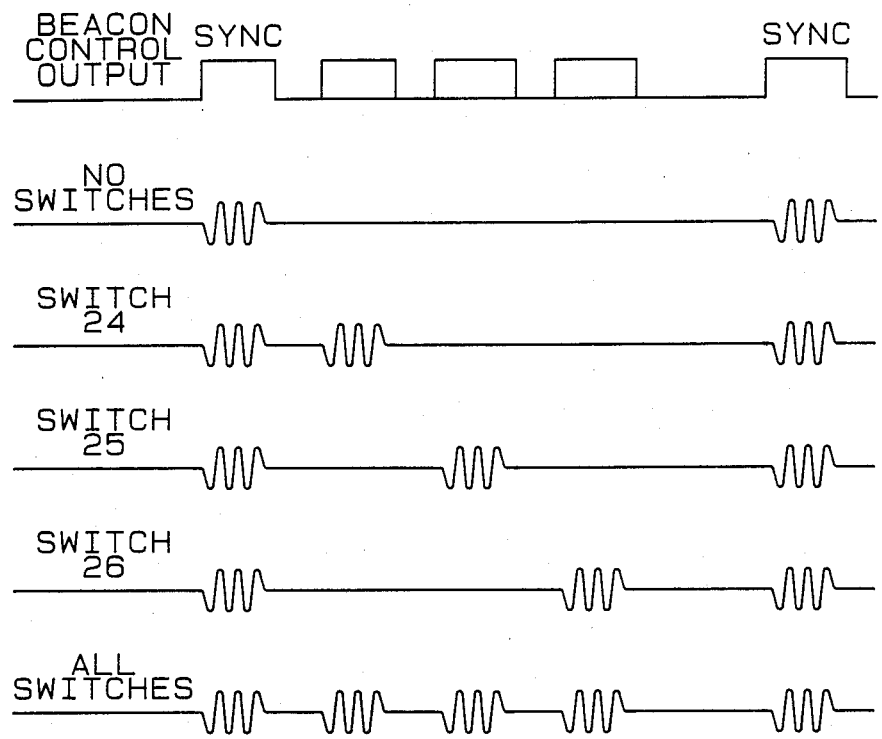
FIGURE #8
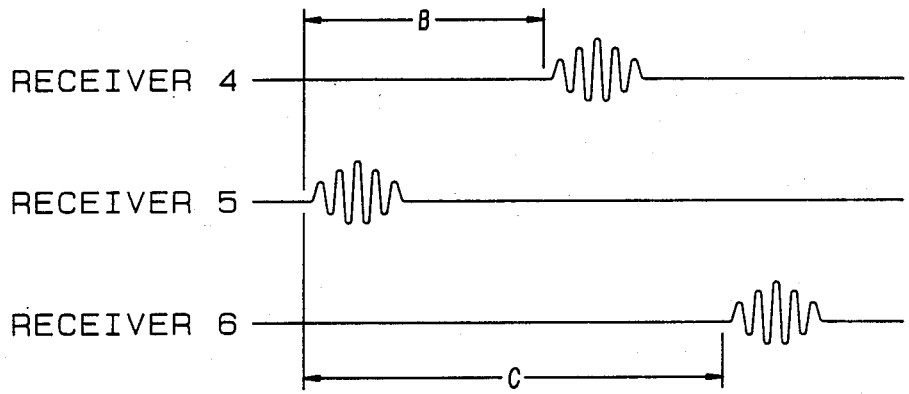
FIGURE #9

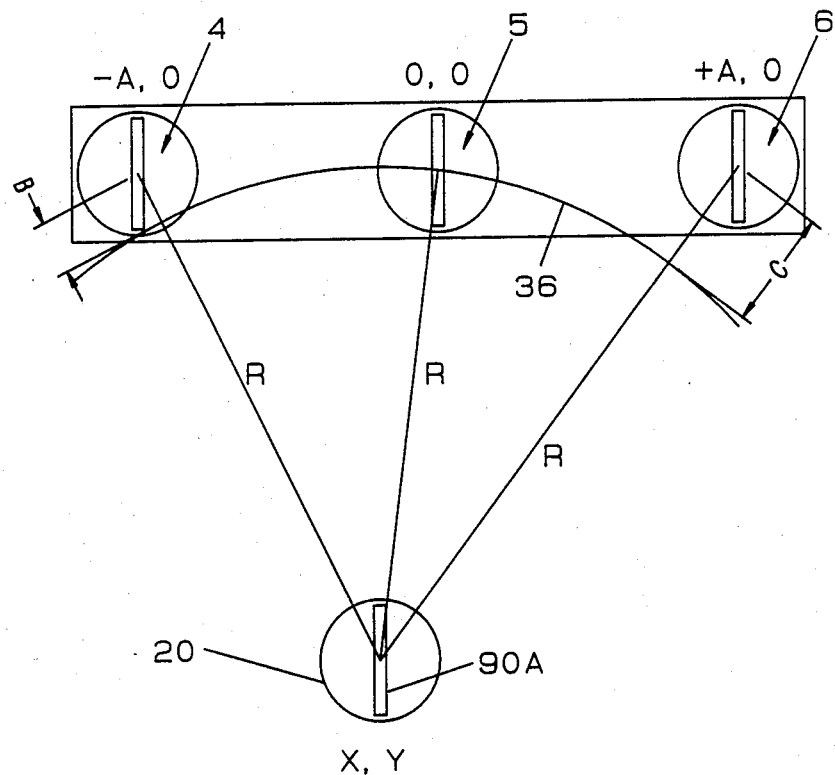
FIGURE #10

WIRELESS CURSOR CONTROL SYSTEM

FIELD OF THE INVENTION

This invention relates to input systems for computers. More particularly this invention relates to a cursor control system. A cursor control system, more typically called a mouse or a digitizer, enables a user to input either relative movement in the case of a mouse or absolute position in the case of a digitizer.

BACKGROUND OF THE INVENTION

A computer system normally includes a video display terminal which usually provides user feedback with a cursor to enable the user to either select an elemental area of the screen in the case of a mouse, or an elemental area of the digitizing surface in the case of a digitizer. There have previously been proposed various types of cursor control systems such as light pens, mice, track balls and other devices which require the use of a wire to either communicate positional information or carry electrical signals for measurement of position by various means.

A light pen includes a stylus with a photoelectric detector which is held to a CRT to detect the time when an electron beam passes its position. It must be used with a scanning CRT, it operates on light emitted by the CRT, and it is different from all acoustic digitizers. See, for example, U.S. Pat. No. 3,825,746.

A track ball is a ball which can be rotated in any direction within a fixed socket. A computer senses the direction and extent of movement, usually by means of wheels which rub against the ball in orthagonal directions. Each wheel is connected to a tachometer which indicates movement and direction of each such wheel. This is a relative device which cannot provide absolute position information. Further, this device requires a mechanical connection between the positioning element and the measuring system.

A touch pad involves the use of a flat pad which can be touched by a stylus or a finger. The pad senses the location of the touching object usually by resistance or capacitance disturbances in the field associated with the pad. A touch pad can also use acoustic surface waves, e.g., see U.S. Pat. No. 3,653,031.

Mechanical mice have also been used previously. See, for example, U.S. Pat. No. 4,464,652. Basically such devices involve an upside down track ball which is rolled across the desk or other work surface by the operator. Such devices require a wire connection to the computer and there must be frictional contact with the surface. Because these are mechanical systems there are also inherent mechanical problems with such systems. Good frictional contact must be maintained with the work surface. The mice also include a number of components which must be made with close tolerances. The mice may also generate mechanical noise and must be frequently cleaned.

Optical mice are also described in U.S. Pat. Nos. 4,364,035 and 4,390,873. These devices reflect light off of a pattern on a pad. As the pattern of the reflected light changes, the mouse can determine the direction and velocity of movement of the device. Thus, such devices require the use of a special pad over which the mouse operates. Such devices also require use of a wire connection to the computer.

There has also been proposed a mouse which utilizes cloth to generate acoustic energy which it then measures in order to determine the speed at which the mouse is moving but cannot determine direction by acoustic means. The cloth rubs upon the work surface to generate the sound. The system requires use of a wire connection, and it does not generate an acoustic wave.

The mice which have previously been used are relative devices which only report movement, as opposed to digitizers which report absolute position.

There have also been proposed magnetic and electrostatic digitizers which involve the use of a pad over which a stylus or puck may operate. The stylus or puck generates an electromagnetic or electrostatic signal and the pad receives it. In some devices, however, the stylus may receive and the pad may transmit. The pad contains horizontal and vertical rows of wires and can interpolate the position of the stylus or puck between any two wires. The devices operate on signal amplitude and phase and are subject to electromagnetic and electrostatic interference. Electrostatic digitizers operate poorly on conductive surfaces. See U.S. Pat. No. 3,904,822.

There have also been proposed spark digitizers which generate an acoustic wave, usually from a spark transmitter. See, e.g., U.S. Pat. Nos. 4,012,588; 4,357,672; and 3,838,212. The position of the stylus is determined by timing the transit time of the acoustic wave from the source to the receiver. There are several disadvantages with such spark digitizers. The spark is a shock hazard and may also be a fire hazard. The spark also generates electromagnetic interference and makes audible noise. It is also necessary for the spark to be synchronized with the receiver timers. Of course, such digitizers also require use of a wire to carry the necessary power to generate the spark and to carry switch information. Although wireless spark digitizers are also described in U.S. Pat. Nos. 4,012,588 and 4,124,838, they exhibit most of the same disadvantages described above with respect to spark digitizers using a wire. They also provide no capability for incorporating switches into the wireless device nor are they adaptable to a stylus type steering means.

Systems which require a wire connection between the movable device and the computer have several inherent disadvantages. For example, the wire is cumbersome and expensive to produce in a flexible form. Also, it can be kinked and twisted. Accordingly, it can be broken or operate intermittently. Systems which require active pads on which the movable device operates are quite expensive, and the large pad is difficult to store when not in use. There are also significant power requirements inherent with such systems.

SUMMARY OF THE PRESENT INVENTION

In accordance with the present invention there is provided a low cost, compact, wireless cursor control system for a computer. The system involves the use of a wireless stylus or puck which is very easy and safe to use and does not require a special pad or surface.

In one embodiment the invention provides:

A position control system adapted to control cursor movement on a video display terminal, the system comprising:

(a) a wireless movable steering means adapted to emit periodic acoustic signals;

(b) tracking means adapted to receive the acoustic signals and determine the position of the steering means;

(c) communication means adapted to communicate the position (either an absolute position or relative movement) of the steering means to the video display terminal, whereby movement of the cursor is controlled by the steering means.

In a preferred embodiment the movable steering means includes a beacon which periodically radiates airborne acoustic energy waves. The tracking means is adapted to track the position and movement of the steering means by hyperbolic triangulation of the airborne acoustic waves. The tracking assembly is able to correlate waveforms between multiple receiver channels and can also measure and compensate for the errors of the measurement, including temperature compensation for variations of the speed of sound in air and variations in phase delay through its various channels.

The control system of this invention is operable on any surface and does not require a pad. It also eliminates the use of dangerous voltages and shock hazards. Furthermore, it does not require use of a wire. Also, it does not generate audible noise and it is not subject to electrostatic or electromagnetic interference. The system is very safe in operation and does not present either fire or health hazards. It also avoids the maintenance problems and high failure incidents inherent with mechanical assemblies. The system of this invention is also relatively inexpensive, easy to operate, and very accurate. It has high reliability because there are no mechanical components to wear out or become dirty and malfunction.

It has equivalent sensitivity to previously available devices at much less cost. It can also perform the tasks required of either a digitizer (to denote absolute positions) or a mouse (to denote relative movement). The steering means is effective on any surface, whereas many previously available digitizers will only function on special pads.

BRIEF DESCRIPTION OF THE DRAWINGS

The invention is described in more detail hereinafter with reference to the accompanying drawings, wherein like reference characters refer to the same parts throughout the several views and in which:

FIG. 1 is a perspective view illustrating use of one embodiment of the cursor control system of the invention;

FIG. 2 is a partial cut-away view of one embodiment of stylus useful in the system of this invention;

FIG. 3 is a partial cut-away view of one embodiment of a puck which is also useful in the system of this invention;

FIG. 4 is a schematic diagram of the electronics useful in the stylus or puck steering means;

FIG. 5 is a schematic diagram of the electronics of the cursor control system of the invention;

FIG. 6 illustrates the wide angle radiation pattern of one type of acoustic transducer useful in the steering means;

FIG. 7 illustrates the manner in which an acoustic transducer receives the acoustic signals generated by the steering means;

FIG. 8 shows the manner in which the steering means may be adapted to emit acoustic signals in accordance with various combinations of switch signals;

FIG. 9 illustrates the time differences between the receiving of a particular acoustic signal by three separate receivers; and FIG. 10 illustrates the triangulation algorithm used in the system of this invention to determine the position of the steering means.

DETAILED DESCRIPTION OF THE INVENTION

Thus, in FIG. 1 there is illustrated one embodiment of a wireless cursor control system of the invention in which a hand-held stylus 1 is manipulated by the operator to control cursor movement on video display terminal 30. Terminal 30 may be any graphic or visual display device, for example, a CRT terminal, liquid crystal display device, plasma graphics display device, etc. When the stylus 1 is moved in accordance with any desired path 18, a corresponding path 18A is exhibited by the cursor on the video display terminal 30, as shown. The stylus is operated much like an ordinary pen, utilizing the same motor skills necessary for fine control of a pen-like instrument.

The wireless steering means (e.g., the stylus 1 in FIG. 1) is located by the tracking means 3 by hyperbolic triangulation of airborne acoustic energy waves emitted periodically by the steering means. Preferably the steering means 1 includes at least one keyswitch 53 to enable the user or operator to activate various functions without removing the hand from the steering means.

The tracking means 3 includes a plurality (at least 3) of acoustic receivers 4, 5 and 6 for receiving the acoustic signals emitted by the steering means. Additional receivers may be used, if desired. Preferably, the acoustic receivers 4, 5 and 6 are aligned in a straight line, as shown in FIG. 1, although it is possible for them to be disposed in other arrangements, if desired. Disposed between the acoustic receivers there may be utilized sections 31 and 32 of acoustic absorbing foam.

The tracking means may also be adapted to emit acoustic energy between its receivers for the purpose of self-calibration by measuring the speed of sound in air and by measuring various delay times through its channels. In a preferred embodiment the tracking means performs the hyperbolic triangulation by means of a microprocessor 17, including RAM and ROM and necessary software to convert the measurements into X position and Y position, or delta X movement and delta Y movement. This information is then communicated to the computer via cable 38.

In FIG. 2 there is shown a partial cut-away view of stylus 1 showing plastic tubular body member 1B in which there is contained a power source 54 (i.e., a D.C. battery such as a 6 volt alkaline or lithium battery). Ultrasonic transducer 20 is contained within stylus 1 near the lower end of body 1B, as shown. Operably connected between battery 54 and transducer 20 are an amplifier, an AND gate, an oscillator to determine the acoustic operating frequency, transducer control, and counter. Throat 91 extends from aperture 90 at the lower end of stylus body 1B upwardly to cavity 92 adjacent transducer 20. The air in cavity 92 acts as an air resonator. The aperture 90 has a diameter less than one-half the wavelength of the acoustic signal generated by transducer 20. Aperture 90 may be circular in cross-section, or it may have any other desired cross-sectional configuration so long as its greatest dimension is less than one-half the wavelength of the acoustic signal. The opening at the lower end of the aperture may be planar or non-planar so long as the opening acts as a single aperture of less than one-half the wavelength of the acoustic signal in its maximum dimension.

In FIG. 3 there is shown a partial cut-away view of puck 2 showing plastic body member 2A in which there is contained power source 29 (e.g., a D.C. battery such as a conventional 9 volt battery). Ultrasonic transducer 20 is contained within the body 2A near the forward end thereof. Operably connected between battery 29 and transducer 20 are an amplifier, an AND gate, an oscillator to determine the acoustic operating frequency, transducer control, and counter. Throat 91A extends from the aperture 90A at the leading edge of the puck body 2A inwardly to cavity 92A adjacent transducer 20. The air cavity 92A acts as an air resonator. The aperture 90A has similar characteristics as aperture 90 described above in connection with stylus 1. Since the puck aperture is always orthogonal to the operating surface, the restriction on aperture size only applies to the width dimension. The height dimension may be larger than a wavelength, if desired. Radiation patterns of various apertures are further described below. Key switches 24, 25 and 26 may be actuated by the operator in order to control additional functions.

The steering means, whether it be the stylus or the puck, is adapted to emit an acoustic wave 36, as shown in FIG. 6. The acoustic wave 36 expands from the point of origin (i.e., aperture 90 or 90A) at approximately one inch each 75 microseconds (0.3 mm/μsec.). The speed of sound in air varies by approximately 1.7% per 10° C. change in temperature.

The stylus and the puck function identically both acoustically and electrically. The puck is operated like a conventional mouse in the sense that the operator's hand rests atop the device with fingers on the keyswitches. The puck is useful where writing control is not necessary. It may be used for long periods of time with reduced muscle fatigue.

Either of these two types of steering devices may be moved in any direction, provided that the user keeps the device in the area where the tracking means can track it, typically within an area up to about 1×1.5 meter. The stylus may be approximately 1 cm. in diameter and 12 cm. in length, for example. The puck may be approximately 2 cm. by 6 cm. by 9 cm. Either device may be made larger or smaller as necessary or desirable to fit comfortably in the user's hand. In the preferred embodiment of the puck there are three keyswitches 24, 25 and 26 for use by the middle three fingers while the thumb and little finger rest on the sides of the body. The stylus typically has one keyswitch 53.

In alternate embodiments, there may be any number of keyswitches, or even none at all. In alternate embodiments, the puck may also contain other pointing mechanisms which could include a transparent surface with a crosshair to be used when selecting elemental areas from the surface below the puck. The body (puck or stylus) also houses the necessary components for the beacon to emit acoustic energy waves, by which the device can be located, and also communicate keyswitch information to the tracking means.

The preferred operating frequencies for the beacon are normally in the range of about 20 Khz to 300 Khz, although it is possible to operate within the broader range of about 2 Khz to 5 Mhz, if desired. The acoustic signal wavelength would be approximately 0.044 inch at 300 Khz and 0.66 inch at 20 Khz.

Operation at the low and high extremes of frequency may result in some loss of capability. Very low frequencies may be audible and do not provide as much resolution as higher frequencies. Very high frequencies result in severe acoustic attenuation which will limit the operating range.

The point which is desired to be located is the origin of the expanding wave. It is not necessary to know when the wave was generated. Each wave consists of a series of cycles at the resonant frequency of the acoustic system which includes the acoustic transducer 20 and the resonant air cavity 92 and 92A, respectively, of the stylus and puck. Non-resonant acoustic transducers may also be used. One example of an ultrasonic acoustic resonant transducer is commercially available from Projects Unlimited, Inc. as type SQ-40T-16.

The resonant air cavity optimally consists of two parallel surfaces, one is vibrating at the resonant frequency, and the other contains the throat 91 or 91A connected to its center. The surfaces are separated by an integer multiple of one-half of the desired operating wavelength. At 40 Khz, for example, with N=1, a typical separation between surfaces would be 0.16 inches. The signal reflected off of the surface containing the throat strikes the vibrating surface in phase serving to increase the deflection of the next cycle, with the positive feedback increasing the signal amplitude. The air resonance acts to force the acoustic wave along the throat 91 or 91A which serves to make the wave coherent as it exists through the diffraction aperture 90 or 90A. Either surface may be made unparallel with the other, for example one surface may be cone shaped. This can be used to reduce the "Q" of the resonator if it is too high. However, twice the spacing between the two surfaces cannot be an odd multiple of one-half of a wavelength at the operating frequency or the cavity will be anti-resonant, and will cancel the signal generated by the transducer.

The diffraction aperture which is usually the same size as the throat will disperse the acoustic energy equally over a wide angle of up to 180 degrees. Even greater than 180 degrees has been achieved with some loss in signal amplitude. If the aperture is rectangular in shape, as may be the case with 90A, with the short dimension less than one-half of a wavelength at the operating frequency, and the long dimension longer than a wavelength (preferably two wavelengths) then the radiation pattern will be a one-half cylinder. If the aperture is approximately a hole, as in 90, with the diameter less than one-half wavelength, then the radiation pattern is a one-half sphere. These radiation patterns are referred to as omnidirectional as they exhibit essentially uniform sensitivity over the described angle or direction. The optimum size of the aperture varies with the acoustic design behind the aperture, angle of the desired radiation pattern, coherency of the signal arriving at the aperture, and the frequency of operation. Optimum sizes for different acoustic systems have been found between one-twelfth and one-third of a wavelength at the operating frequency.

FIG. 4 is a schematic diagram of the electronics for the operation of the stylus and the puck (herein referred to as the beacon) in terms of the generation of acoustic signals. In each device a battery provides the requisite power. The timing control is provided by a clock oscillator 23 and timing counter 28. Gate 22 is an AND gate which gates the acoustic operating frequency of the acoustic transmit wave from the clock oscillator 23 as controlled by control 27 (e.g., RCA CD 4512 B). The control gates the SYNC signal and switch signals to the AND gate 22 at the appropriate time. Amplifier 21 drives the acoustic transducer 20.

The beacon periodically gates a series of cycles at the acoustic operating frequency. These cycles are sometimes referred to herein as the SYNC pulse. If any of the keyswitches 24, 25 or 26 are depressed then the beacon control 27 will gate other pulses which are spaced at known time intervals after the SYNC pulse. This is illustrated in FIG. 8. A dead time precedes the SYNC pulse so that the tracking means can always identify it as the SYNC pulse. Other definitions may be used for the keyswitches, if desired. For example, they may be set such that a pulse is transmitted when the switch is not pressed.

All of the beacon electronics may be contained in one or more CMOS integrated circuits. This enables battery powered operation because of the low power requirements. Optionally, the beacon control 27 may be adapted to halt the clock oscillator 23 whenever no switch has been pressed for a given period of time. This reduces the power requirement effectively to zero when the device is not in use. Whenever a switch is pressed the beacon control will start the clock oscillator and start emitting acoustic waves again. So long as one of the switches is pressed within the predetermined period of time, typically ten minutes, the beacon will continue to function until no switch has been pressed for the full predetermined period. This eliminates the need for an on/off switch.

The tracking means is adapted to receive the acoustic signals emitted by the beacon of the stylus or the puck and determine the position of the steering means. Preferably the tracking means comprises an elongated housing 3A in which the acoustic receivers are contained. One such acoustic receiver is illustrated in FIG. 7 where there is shown a portion of housing 3A, aperture 3B, cavity 3C, and throat 3D, and ultrasonic transducer 4A recessed within the housing. The transducer may be of the same type as used in the stylus and the puck (e.g., type SQ-40T-25 from Projects Unlimited, Inc.). Each of the receivers in the tracking means is of the same design, although only receiver 4 is illustrated in FIG. 7.

The transducers in the tracking means may be resonant or non-resonant types. If they are of the resonant type they should match the resonant frequency of the resonance in cavity 3C and also the beacon operating frequency.

Certain types of acoustic transducers may need to be mounted in an acoustic absorbing material which may be foam or rubber to prevent acoustic energy from coupling to or from the housing 3A.

An acoustic signal 36 appearing across the face of the receiving aperture will appear in phase regardless of the direction from which the signal is coming, so long as the signal appears to have originated from a point in a plane perpendicular to the receive aperture slot 3B. The receive throat 3D serves to make the received signal coherent as it drives the resonance in cavity 3C.

The receiver resonant air cavity operates the same as the transmit air cavity, with the exception that the receiver resonant air cavity is driven from the throat 3D. The resonant air cavity drives acoustic transducer 4A which generates electrical signals correlating to the acoustic wave the transducer receives.

The housing 3A may also contain a printed circuit assembly on which is mounted some or all of the electrical components shown in FIG. 5. A typical convenient size for the tracking housing is approximately 14 inches long, 3 inches deep, and 1.5 inches high. Only the length is important since the length determines the maximum separation of the acoustic receivers, which ultimately determines the accuracy and resolution of the system.

Also mounted on housing 3A are strips of acoustic damping foam 31 and 32. Acoustic foam has two beneficial properties. First, it absorbs acoustic energy which strikes it. Secondly, because it has a higher index of refraction than air, acoustic energy that is propagated parallel to it near its surface will be refracted into it and then absorbed. These foam sections thus help prevent extraneous noise or reflections from presenting problems.

The electronics of the tracking means is illustrated in FIG. 5. All functions and communication are under the control of the microprocessor 17 hereafter called the processor. A clock oscillator 16 provides clocking for the processor and for the real-time-clock 14. Acoustic energy waves emitted by the beacon are picked up by receive transducers 4, 5 and 6 and converted into electrical energy which is amplified by preamplifiers 7, 8 and 9. These preamplifiers may be be LM318 operational amplifiers. The processor can select one of these preamplifiers to feed into the detector with electronic switch 10. This switch may be an analog switch such as LF13333. Once the received signal passes through the electronic switch 10 it goes to a zero crossing detector 11 which may be an analog comparator such as an LM161. Detector 11 outputs a one signal (V+) whenever its input is positive and outputs a zero (ground) whenever its input is negative. The time latch 15 latches the real-time-clock 14 whenever the zero crossing detector transits from a zero level to a one level. The resolution of the real-time-clock can be approximately 100 nsec (10 mhz). More resolution is not necessary because normal air turbulence causes this much random variation in the measurement.

The analog signal from the electronic switch 10 is also connected to the peak sample-and-hold circuit 12 which samples and holds the value of the peak amplitude of each cycle in the acoustic pulse. This device may be a "precision rectifier" such as can be made from an LM318 along with a diode and capacitor combined with a circuit to reset the capacitor after the analog-to-digital conversion has been completed. The analog-to-digital converter 13, hereafter A-D, converts this peak amplitude to a digital value to be read by the processor. The speed of the A-D converter must be fast enough to capture successive cycles of the acoustic waveform which, for example, at 40 khz would be 25 $\mu$sec apart. An A-D which can convert 40,000 samples per second would be sufficient in this case. Standard "flash" or "successive approximation" A-D's are available such as Siemens SDA-6020. The processor waits for a zero to one transition of the zero detector, at which time it samples the time latch, and the analog-to-digital converter data. The sample-and-hold circuit may not be necessary with certain "flash" A-D circuits, and with some other A-D devices, it may be built into the A-D itself.

Thus the processor can input into its own internal RAM the wave shape from the A-D and exact time each cycle in the acoustic wave was received at each of the acoustic receivers 4, 5 and 6. Although a given acoustic wave may arrive at two receivers at precisely the same time, it is not necessary to have the entire wave data for all three channels from one acoustic wave to perform waveform correlation analysis. It is possible to receive the waveform at different receivers for different acoustic waves because the period between the wave emissions can be determined. The processor samples the waveform on one or more receivers during the time that the first wave is traveling past the tracking device. The processor can do this by setting analog switch 10 to the channel that is desired to be received first, and samples the data from the wave as it passes. Then the processor can switch analog switch 10 to a second channel past which the waveform has not passed. It will usually be possible to input data from at least two receivers from a single wave. The processor can sample the same wave or a different wave at the second channel as the waveform passes that channel. Then the processor switches to the third channel and waits for the wave to pass that channel. When the same or a different waveform passes the third receiver, the processor samples the wave on that channel. After the wave has passed all receivers, the processor has the waveform time and amplitude information for each receiver. The processor then scales the amplitude data from all three receivers to the same maximum peak amplitude. The processor then locates a common point on each of the three waves by correlating the wave shapes of the received waveform on all three channels by comparing the peak amplitude of each cycle in the wave at the three receivers. The most accurate time reference points are zero crossings because at those points the acoustic waveform is changing fastest, leaving the least uncertainty. The zero crossing point for each receiver may be measured, or calculated from other zero crossings on different waves by subtracting the period if the processor was sampling different acoustic waves on different receivers. Other procedures for correlation are possible, for example, having three independent detectors, and three A-Ds, would allow all three channels to be sampled on the same wave, although this would be a more expensive system.

The processor then determines the difference between the arrival time of the waveform at the different acoustic receivers by subtracting the real-time-clock data of the selected zero crossings and computing the two values called B and C in FIGS. 9 and 10. From these two values, plus a constant called A which is the time for a pulse to travel between the center transducer 5 and either of the end transducers 4 or 6, the two unknowns, X and Y can be computed by the equations in FIG. 10.

The derivation of the equations given in FIG. 10 now follows. An expanding wave in a two-dimensional system will take the form of an expanding circle. Two receivers located within the system will receive the wave with some time relationship with each other. The equation for the origin of the wave will describe a hyperbola. A third receiver located within the two dimensional system can be used with either of the first two receivers to describe a second hyperbola. The three receivers may be placed at random in the two dimensional system, and the simultaneous solution of the two hyperbolic equations will often result in a unique solution (at most two solutions) of the origin of the wave. However, if the three receivers are equally spaced in a straight line, and the source of the wave is assumed to only lie on one side of that line, then certain simplifying assumptions can be made. Following is a derivation of the simplified arrangement.

The following triangles are given by the Pythagorean theorem:

$$(X * X) + (Y * Y) = (R * R) \quad \text{Eq. 1}$$

$$(X+A) * (X+A) + (Y * Y) = (R+B) * (R+B) \quad \text{Eq. 2}$$

$$(X-A) * (X-A) + (Y * Y) = (R+C) * (R+C) \quad \text{Eq. 3}$$

Subtracting Eq. 1 from Eq. 2 and Eq. 3 and refactoring yields the following:

$$2 * R = ((A * A) + (2 * A * X) - (B * B))/B \quad \text{Eq. 4}$$

$$2 * R = ((A * A) - (2 * A * X) - (C * C))/C \quad \text{Eq. 5}$$

Setting the right halves of Eq. 4 and Eq. 5 equal and solving for X yields:

$$X = ((A * A) + (B * C)) * (B - C)/(2 * A * (B + C)) \quad \text{Eq. 6}$$

Plugging X back into Eq. 4 or Eq. 5 yields two solutions for R:

$$R = ((A * A) + (2 * A * X) - (B * B)/(2 * B) \quad \text{Eq. 7}$$

$$R = ((A * A) - (2 * A * X) - (C * C)/(2 * C) \quad \text{Eq. 8}$$

Because B or C could approach or equal zero, only use Eq. 8 if C is greater than B to obtain greatest accuracy in the R calculation. Feed X and R back into Eq. 1 to obtain Y:

$$Y = SQRT((R * R) - (X * X)) \quad \text{Eq. 9}$$

The processor uses Eq. 6, Eq. 7 or Eq. 8, and Eq. 9 to determine the X and Y coordinates of the beacon. Constant "A" can be approximated or it can be measured. One way that "A" can be measured is by transmitting on acoustic transducer 4 from amplifier 18 through switch 10A during the beacon dead time and measuring the real-time-clock when the wave passes transducer 5 and again when the wave passes transducer 6. The difference in the real-time-clock measurements yields the constant "A". If the opposite is done by transmitting on acoustic transducer 6 from amplifier 19 through switch 10B and receiving on transducers 5 and 4, then the variations in phase delay between channels 4 and 6 can be determined. Any phase delay that is the same for all the channels does not affect any of the equations and need not be considered.

The processor maintains the last value of X and Y to compare with the current values. Whenever changes occur with the beacon position, or in the keyswitch information, or periodically or whenever queried by the main CPU; the microprocessor will send status of the cursor control system to the main CPU. The main CPU then controls the cursor on the video display terminal, to allow the user to select an elemental area or activate a function.

Although the processor could perform a full correlation each time new acoustic wave data is received, this is not necessary. Since the beacon can only move a small distance between acoustic wave emissions, one can track the position, velocity, and acceleration of the beacon with only the zero crossing data. The zero crossings may be selected from different cycles in the wave for each of the three different channels so that all three channels may be read for every wave even though the received wave may be simultaneous or overlap at different receivers. This is because when tracking, only one zero crossing is necessary from each channel. The wave is several cycles long. Because we know the operating frequency, we can extrapolate the location of a specific zero crossing on each channel from a crossing several cycles earlier or later. Knowing the approximate location of the beacon from the previous wave, one can predict the order with which to read the three channels, and where each zero crossing will occur. This is done by computing the position, velocity, and acceleration, of the beacon based upon previous triangulations and calculating when the zero crossing will occur on each channel. If it is found within a certain distance from where it was expected, then that position is accepted. The amplitude associated with that particular crossing may be tracked as a double check to ensure that the tracking algorithm has not skipped a cycle. If either the zero crossing time or the amplitude doesn't match within a certain limit, then a full correlation is required.

Another type of tracking can be utilized. This is called "period tracking". Because we know where the beacon is, we can compute the emission time which is the time that the acoustic wave started expanding from the aperture. The emission is periodic and repeats with a calculable period. The hyperbolic calculation of position can be distorted temporarily by acoustic disturbances by some small amount. An example of common disturbance is turbulence caused by an object moving by, or a nearby fan. By using the period generated by the long-term average of some number of previous periods, temporary acoustic disturbances can be averaged out in the calculated period. The calculated period can be used to determine a reference time which can represent the emission time with greater resolution than can be measured. This improved reference time can be used to reduce random movement (jitter) and to increase the resolution of the measurement. This enhancement does not increase the accuracy of the measurement. It only provides for more counts per unit distance while averaging out temporary disturbances. The result is smoother lines with less jitter. The reference time is calculated in real-time. The reference time is subtracted from the real-time measurement of when the signal arrived at the receive transducers. The calculated distance to the left and right receivers (any two could be used) yields the time averaged position. In addition, if the calculated reference time should ever vary from the measured reference time by more than one-half wavelength (12.5 $\mu$sec at 40khz), then the correlation attempt has failed or the device has become unlocked and is no longer correlated. This provides a triple check on the correct operation of the device.

Although we have described a preferred tracking system which is two-dimensional, it is also possible to locate the steering means in three dimensions with the present invention. For three dimensional tracking it is preferred to use four receivers forming a square (i.e., in the same plane).

Other variations are also possible without departing from the scope of this invention. For example, the steering means may include a crosshair for locating elemental areas below it. Other variations are also possible.

What is claimed is:

1. A position control system adapted to control cursor movement on a video display terminal, said system comprising:

(a) a wireless movable steering means adapted to emit periodic acoustic signals;
   (b) tracking means adapted to receive said acoustic signals and determine the position of said steering means;
      wherein said tracking means comprises a plurality of acoustic receivers adapted to sense said acoustic signals;
      wherein said tracking means further comprises processing means adapted to measure the time difference of the sensing of said acoustic signals by said receivers and being further adapted to convert said time difference into a coordinate position of said steering means; and
   (c) communication means adapted to communicate said position of said steering means to said video display terminal;
      wherein said steering means is adapted to communicate with said tracking means solely by means of acoustical signals.

2. A position control system in accordance with claim 1, wherein said acoustic receivers comprise transducers.

3. A position control system in accordance with claim 2, wherein said acoustic receivers each comprise a transducer recessed within a cavity, wherein said acoustic signals enter said cavity through an aperture.

4. A position control system in accordance with claim 1, wherein said acoustic receivers are aligned in a straight line.

5. A position control system in accordance with claim 1, wherein said steering means comprises an elongated stylus.

6. A position control system in accordance with claim 1, wherein said steering means comprises a puck.

7. A position control system in accordance with claim 1, wherein said steering means includes a transmitting transducer which is adapted to emit said acoustic signals.

8. A position control system in accordance with claim 7, wherein said steering means includes switch means operable to actuate said transmitting transducer.

9. A position control system in accordance with claim 8, wherein said steering means is adapted to discontinue emission of said acoustic signals in the event said switch means has not actuated said transmitting transducer within a predetermined time period.

10. A position control system in accordance with claim 7, wherein said transmitting transducer exhibit omnidirectional transmitting characteristics.

11. A position control system in accordance with claim 10, wherein said transmitting transducer utilizes a diffraction principle to effect omnidirectional transmitting characteristics.

12. A position control system in accordance with claim 1, wherein said steering means is adapted to emit a plurality of acoustic signals pulsed at different time intervals.

13. A position control system in accordance with claim 1, wherein said acoustic receivers exhibit omnidirectional reception characteristics.

14. A position control system in accordance with claim 13, wherein said acoustic receivers utilize a diffraction principle to effect omnidirectional reception characteristics.

* * * * *